(12) United States Patent
Rathinasamy

(10) Patent No.: US 11,757,226 B2
(45) Date of Patent: Sep. 12, 2023

(54) SYSTEMS AND METHODS FOR TRANSCEIVER CONNECTOR PROTECTION

(71) Applicant: Dell Products L.P., Round Rock, TX (US)

(72) Inventor: Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 17/570,158

(22) Filed: Jan. 6, 2022

(65) Prior Publication Data

US 2023/0216231 A1 Jul. 6, 2023

(51) Int. Cl.
*H01R 13/44* (2006.01)
*H01R 13/453* (2006.01)

(52) U.S. Cl.
CPC ..... *H01R 13/4532* (2013.01); *H01R 2201/04* (2013.01)

(58) Field of Classification Search
CPC .. H01R 13/4532; H01R 13/44; H01R 13/447; H01R 13/4536
See application file for complete search history.

(56) References Cited

U.S. PATENT DOCUMENTS

| | | | | |
|---|---|---|---|---|
| 6,589,066 B1* | 7/2003 | Wu | ..................... | H01R 13/6275 439/352 |
| 7,052,306 B2* | 5/2006 | Ishigami | .............. | G02B 6/4201 439/372 |
| 7,473,124 B1* | 1/2009 | Briant | ................... | H01R 13/629 439/352 |
| 7,704,085 B1* | 4/2010 | Chang | .................. | H01R 13/447 439/928.1 |
| 8,435,054 B2* | 5/2013 | Liu | ........................ | G06F 1/1626 439/142 |
| 8,500,481 B2* | 8/2013 | Lin | ....................... | H01R 13/639 439/138 |
| 8,882,531 B2* | 11/2014 | Kuo | ...................... | H01R 12/724 439/372 |
| 8,934,224 B2* | 1/2015 | Iwamoto | ............... | G06F 1/1616 439/153 |
| 9,001,515 B2* | 4/2015 | Tang | .................. | H01R 13/6335 361/728 |
| 9,210,242 B2* | 12/2015 | Hobson | ................. | G06F 1/1656 |
| 9,246,262 B2* | 1/2016 | Brown | .................. | H01R 13/62 |
| 9,317,077 B2* | 4/2016 | Mori | ..................... | G06F 1/1616 |
| 10,916,887 B2* | 2/2021 | Chan | .................... | H01R 13/512 |
| 10,938,479 B1* | 3/2021 | Teeter | .................. | G02B 6/4246 |
| 11,545,778 B2* | 1/2023 | Lee | ........................ | H01R 24/64 |

(Continued)

*Primary Examiner* — Harshad C Patel
(74) *Attorney, Agent, or Firm* — Jackson Walker L.L.P

(57) ABSTRACT

An information handling resource may include a housing configured to house electronic components, a connector configured to communicatively couple a cable to the electronic components, the connector configured to couple to the cable via a connector opening of the housing, and a connector cover rotatably coupled to the housing proximate to the connector opening and configured to rotate between a closed position in which the connector cover substantially covers the connector opening in order to obstruct contaminants entering the connector opening from an exterior of the housing and an open position allowing the cable to be inserted into the connector opening.

21 Claims, 3 Drawing Sheets

(56) References Cited

U.S. PATENT DOCUMENTS

| | | | | |
|---|---|---|---|---|
| 2013/0034985 | A1* | 2/2013 | Lin | H01R 13/447 |
| | | | | 439/347 |
| 2022/0403348 | A1* | 12/2022 | Xie | C12N 9/0016 |
| 2022/0405216 | A1* | 12/2022 | Rathinasamy | H04B 10/40 |

* cited by examiner

SYSTEMS AND METHODS FOR TRANSCEIVER CONNECTOR PROTECTION

TECHNICAL FIELD

The present disclosure relates in general to information handling systems, and more particularly to systems and methods for protecting a transceiver connector.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface configured to receive an optical transceiver module (e.g., a small form-factor pluggable (SFP) transceiver or a quad small form-factor pluggable (QSFP) transceiver of any I/O speed). Such transceiver modules often plug into "cages" disposed on an I/O interface card, which often reside in the rear of the information handling system. Fiber optic cables (such as Multi-Fiber Push On or "MPO") may couple to optical transceiver modules in order to facilitate networked communication.

When a connector of an optical transceiver module is not populated with a corresponding cable, such connector may become exposed to external elements, including contamination by dust, moisture, corrosive particles, and/or other contaminants that may adversely affect functionality of the optical transceiver module.

SUMMARY

In accordance with the teachings of the present disclosure, the disadvantages and problems associated with existing optical transceiver modules may be reduced or eliminated.

In accordance with embodiments of the present disclosure, an information handling resource may include a housing configured to house electronic components, a connector configured to communicatively couple a cable to the electronic components, the connector configured to couple to the cable via a connector opening of the housing, and a connector cover rotatably coupled to the housing proximate to the connector opening and configured to rotate between a closed position in which the connector cover substantially covers the connector opening in order to obstruct contaminants entering the connector opening from an exterior of the housing and an open position allowing the cable to be inserted into the connector opening.

In accordance with these and other embodiments of the present disclosure, an information handling system may include a processor and an information handling resource communicatively coupled to the processor, the information handling system comprising a housing configured to house electronic components, a connector configured to communicatively couple a cable to the electronic components, the connector configured to couple to the cable via a connector opening of the housing, and a connector cover rotatably coupled to the housing proximate to the connector opening and configured to rotate between a closed position in which the connector cover substantially covers the connector opening in order to obstruct contaminants entering the connector opening from an exterior of the housing and an open position allowing the cable to be inserted into the connector opening.

In accordance with these and other embodiments of the present disclosure, a method may include housing electronic components and a connector within a housing, the connector configured to communicatively couple a cable to the electronic components, the connector configured to couple to the cable via a connector opening of the housing and rotatably coupling a connector cover to the housing proximate to the connector opening such that the connector cover is configured to rotate between a closed position in which the connector cover substantially covers the connector opening in order to obstruct contaminants entering the connector opening from an exterior of the housing and an open position allowing the cable to be inserted into the connector opening.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
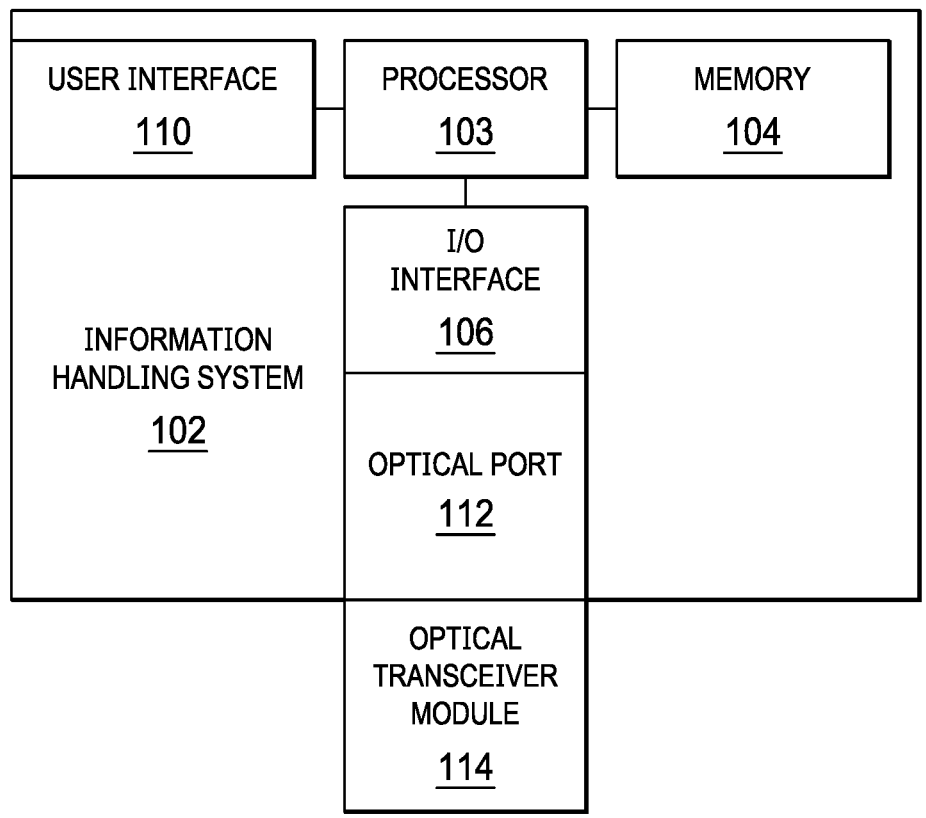
FIG. 1 illustrates a block diagram of selected components of an example information handling system, in accordance with embodiments of the present disclosure.

Preferred embodiments and their advantages are best understood by reference to FIGS. 1 through 5B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and other information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an electrical connector in the form of any suitable combination of a jack, a socket, and/or "cage" for receiving a corresponding connector of an optical transceiver module 114.

Optical transceiver module 114 may include any system, device, or apparatus that houses and includes an optical transceiver configured to convert an incoming optical signal into an equivalent electrical signal, and communicate such equivalent electrical signal to I/O interface 106, and also configured to receive an electrical signal from I/O interface 106, convert such electrical signal into an equivalent optical signal, and communicate such optical signal as an outgoing optical signal (e.g., via an optical cable, which may be integral to the same assembly as optical transceiver module 114). Optical transceiver module 114 may include a small form-factor pluggable (SFP) transceiver, a quad small formfactor pluggable (QSFP) transceiver, or any other suitable form factor.

In addition to processor 103, memory 104, I/O interface 106, user interface 110, optical port 112, and optical transceiver module 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
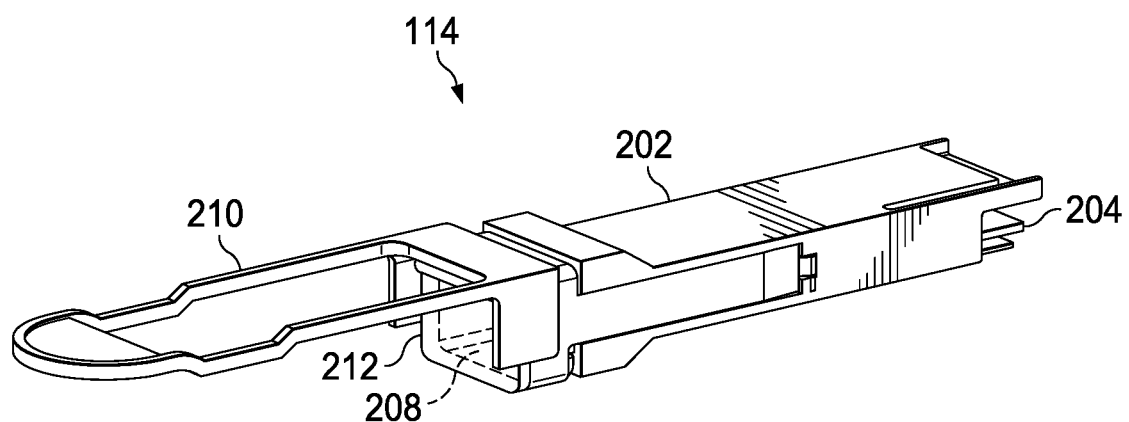
FIG. 2 illustrates a perspective view of an example optical transceiver module, in accordance with embodiments of the present disclosure.

FIG. 2 illustrates a perspective view of an example optical transceiver module 114, in accordance with embodiments of the present disclosure. In some embodiments, example optical transceiver module 114 depicted in FIG. 2 may be used to implement optical transceiver module 114 of FIG. 1. As shown in FIG. 2, optical transceiver module 114 may include a housing 202 for housing an optical transceiver 204 and one or more other components, a connector 208 for receiving a corresponding cable, and a pull tab 210. Housing 202 may comprise a metal enclosure configured to house and/or provide mechanical structure for optical transceiver 204, including mechanical features (e.g., guiding features) for aligning and/or mechanically securing optical transceiver 204 to I/O interface 106 via optical port 112.

Optical transceiver 204 may include any system, device, or apparatus configured to receive an incoming optical signal (e.g., via a cable received within connector 208), convert the incoming optical signal into an equivalent electrical signal, and communicate such equivalent electrical signal to I/O interface 106 (e.g., via optical port 112), and also configured to receive an electrical signal from I/O interface 106 (e.g., via optical port 112), convert such electrical signal into an equivalent optical signal, and communicate such optical signal as an outgoing optical signal (e.g., via a cable received within connector 208).

Connector 208 may include any suitable system, device, or apparatus capable of communicatively coupling to a cable (e.g., an optical cable comprising one or more optical fibers). Accordingly, connector 208 may communicatively couple such one or more optical fibers integral to the cable to optical transceiver 204, thus enabling communication with optical transceiver 204 via such optical fibers.

Pull tab 210 may comprise a handle or other mechanical feature that may enable a person to readily insert optical transceiver module 114 into optical port 112 and/or readily remove transceiver module 114 from optical port 112.

As also depicted in FIG. 2, optical transceiver module 114 may include a connector cover 212 rotatably coupled via a hinge to pull tab 210, such that connector cover 212 may be rotated relative to housing 202 between a closed position in which connector cover 212 substantially covers and obstructs connector 208 and an open position in which connector cover 212 leaves connector 208 unobstructed to allow insertion of a cable into connector 208. Accordingly, as described in greater detail below, in the closed position connector cover 212 may cover connector 208, obstructing potential contaminants from entering connector 208, while in the open position a cable may be inserted into connector 208. Connector cover 212 may comprise metal, plastic, and/or any other suitable material.

Figure 3A:
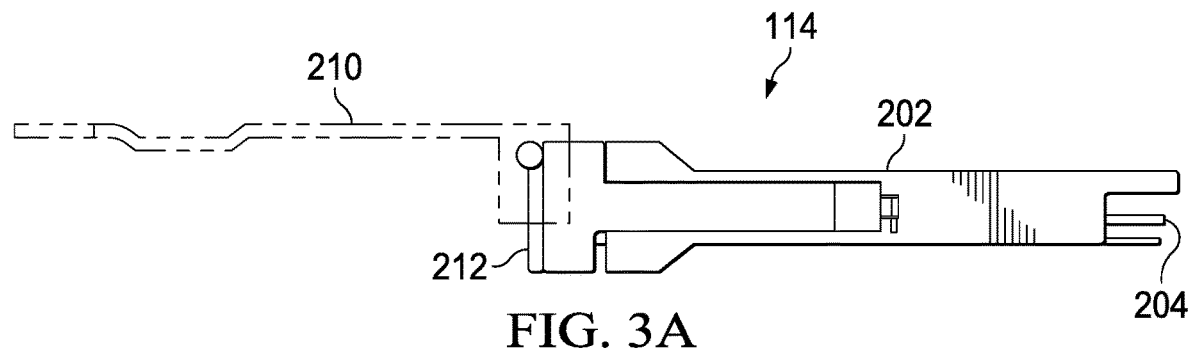
FIGS. 3A-3C illustrate side elevation views of the example optical transceiver module depicted in FIG. 2, each depicting a connector cover in different positions, in accordance with embodiments of the present disclosure.
Figure 3B:
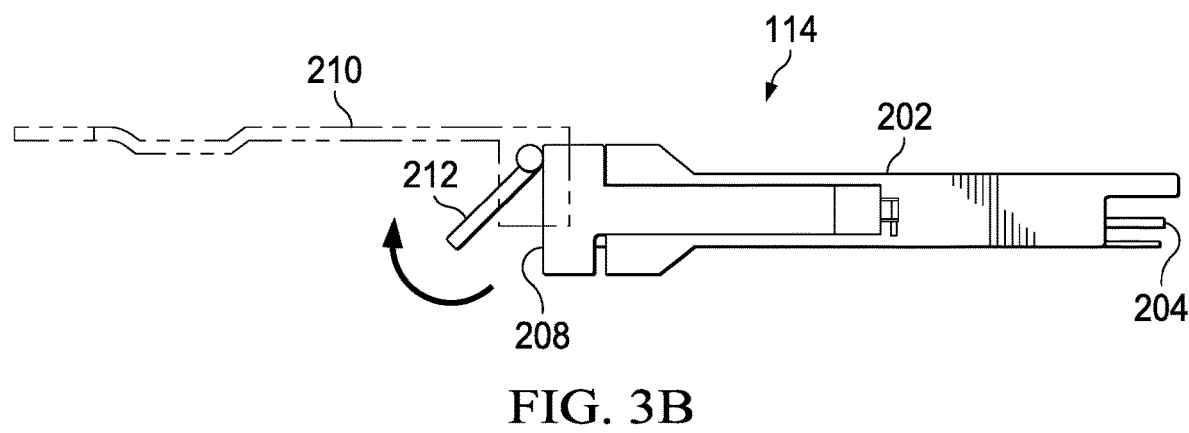
Figure 3C:
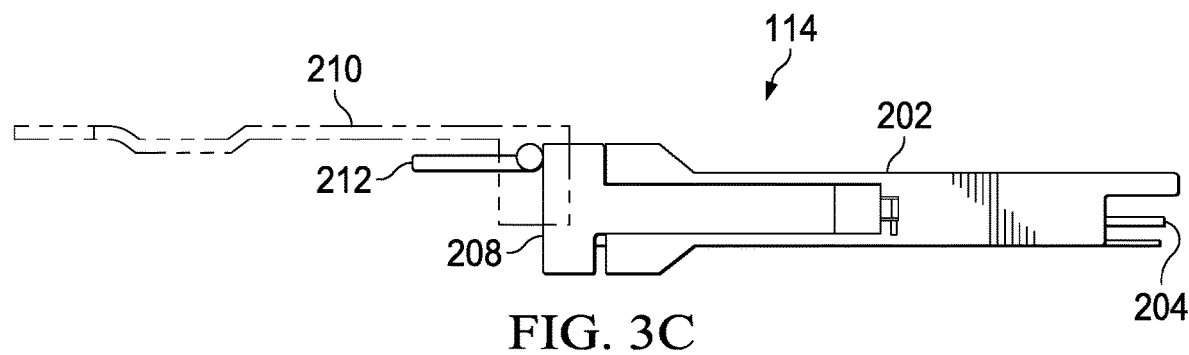

FIGS. 3A-3C illustrate side elevation views of the optical transceiver module 114, each depicting connector cover 212 in different positions, in accordance with embodiments of the present disclosure. For example, FIG. 3A illustrates connector cover 212 in the closed position in which connector cover 212 covers connector 208. To insert a cable into connector 208, a user may apply force to rotate connector cover 212 relative to housing 202 in an outward and upward direction, in order to rotate connector cover 212 through a partially open position shown in FIG. 3B to the open position shown in FIG. 3C. When connector cover 212 is in the open position, the user may insert a suitable cable into connector 208.

Figure 4A:
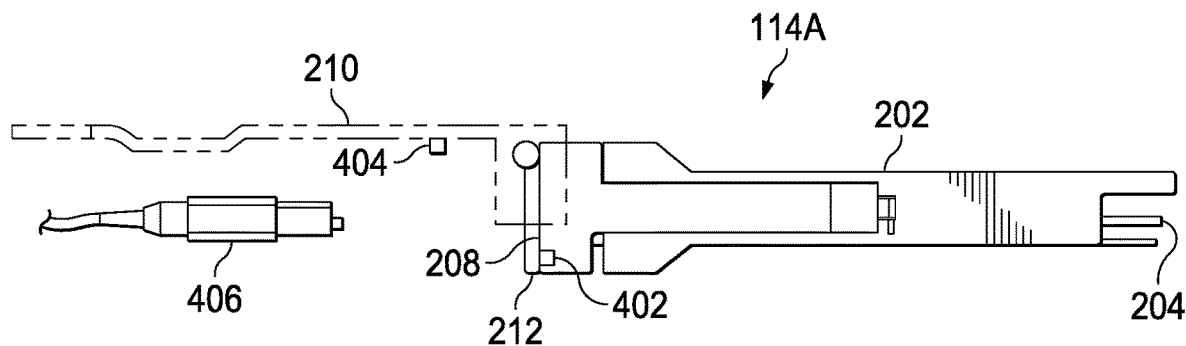
FIGS. 4A and 4B illustrate side elevation views of an example optical transceiver module having magnets for maintaining a connector cover in either of an open position or a closed position, each depicting the connector cover in different positions, in accordance with embodiments of the present disclosure.
Figure 4B:
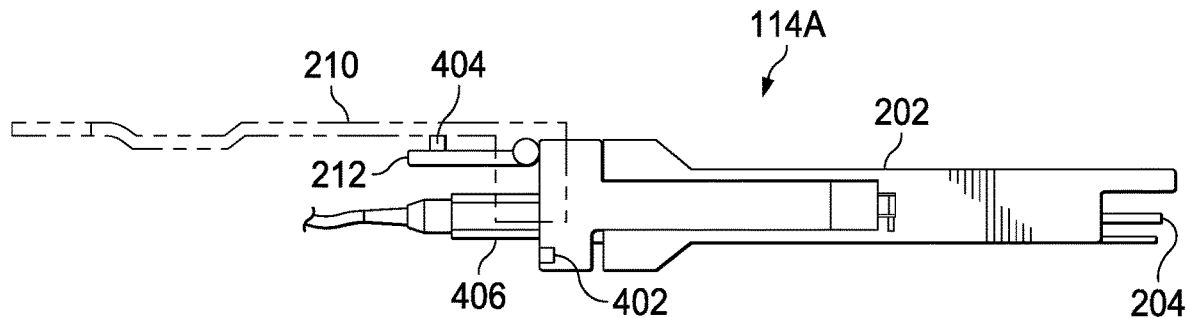

FIGS. 4A and 4B illustrate side elevation views of an example optical transceiver module 114A, which may be used to implement optical transceiver module 114 depicted in FIGS. 2-3C, in accordance with embodiments of the present disclosure. As shown in FIGS. 4A and 4B, optical transceiver module 114A may include a first magnet 402 integrated within or otherwise coupled to housing 202 and a second magnet 404 integrated within or otherwise coupled to pull tab 210. In the embodiments represented by FIGS. 4A and 4B, connector cover 212 may comprise ferromagnetic material or otherwise have a magnet integrated within. First magnet 402 may be positioned within housing 202 proximate to connector 208 such that when connector cover 212 is in the closed position, first magnet 402 may apply a magnetic force to connector cover 212 to mechanically bias connector cover 212 in the closed position.

To open connector cover 212, a user may apply a force to connector cover 212 that overcomes the magnetic force of first magnet 402 to rotate connector cover 212 to the open position. Second magnet 404 may be positioned within pull tab 210 such that when connector cover 212 is in the open position, second magnet 404 may apply a magnetic force to connector cover 212 to mechanically bias connector cover 212 in the open position. With connector cover 212 in the open position, the user may insert a cable 406 (e.g., a MPO cable) into connector 208.

To again close connector cover 212, the user may remove cable 406 from connector 208, and apply a force to connector cover 212 that overcomes the magnetic force of second magnet 404 to either rotate connector cover 212 to the closed position or allow gravity to cause connector cover 212 to rotate to the closed position.

Figure 5A:
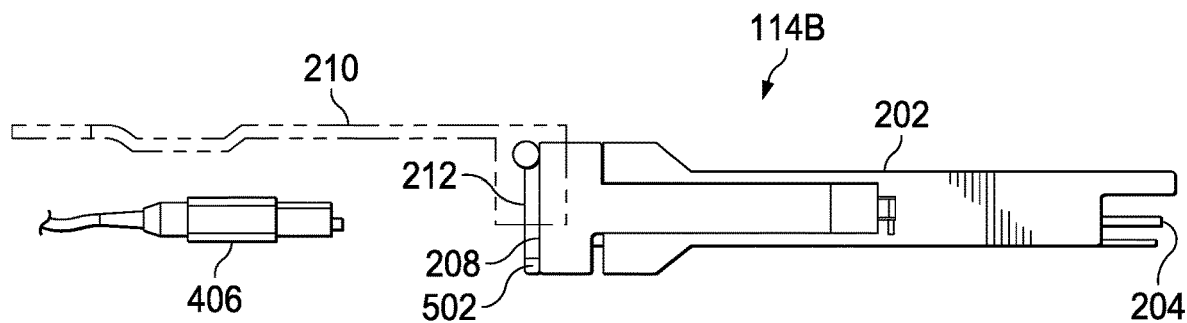
FIGS. 5A and 5B illustrate side elevation views of an example optical transceiver module that employs gravity to maintain a connector cover in a closed position, each depicting the connector cover in different positions, in accordance with embodiments of the present disclosure.
Figure 5B:
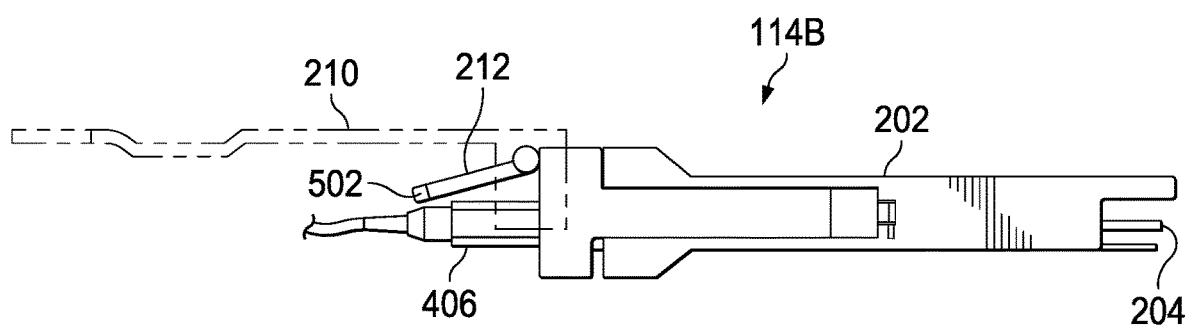

FIGS. 5A and 5B illustrate side elevation views of an example optical transceiver module 114B, which may be used to implement optical transceiver module 114 depicted in FIGS. 2-3C, in accordance with embodiments of the present disclosure. As shown in FIGS. 5A and 5B, connector cover 212 may include a weighted portion 502 at a second end of connector cover 212 opposite from a first end of connector cover 212 coupled to pull tab 210. Weighted portion 502 may have a heavier mass and/or a greater density than the remainder of connector cover 212. Accordingly, provided that optical transceiver module 114B is physically oriented such that the second end is closer to the center of the Earth than the first end, gravitational force acting upon weighted portion 502 and the rest of connector cover 212 may mechanically bias connector cover 212 in the closed position.

To open connector cover 212, a user may apply a force to connector cover 212 that overcomes the gravitational force to rotate connector cover 212 to the open position. With connector cover 212 in the open position, the user may insert a cable 406 (e.g., a MPO cable) into connector 208.

To again close connector cover 212, the user may simply remove cable 406 from connector 208, such that gravitational force acting upon weighted portion 502 and the rest of connector cover 212 causes connector cover 212 to rotate to the closed position.

Although the foregoing contemplates that connector cover 212 is coupled via a hinge to pull tab 210 (thus, indirectly mechanically coupling connector cover 212 to housing 202 via pull tab 210), in some embodiments, connector cover 212 may be directly coupled to housing 202 via a hinge proximate to the opening of connector 208.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling resource comprising:
   a housing configured to house electronic components;
   a connector configured to communicatively couple a cable to the electronic components, the connector configured to couple to the cable via a connector opening of the housing; and
   a connector cover rotatably coupled to the housing proximate to the connector opening and configured to rotate between:
      a closed position in which the connector cover substantially covers the connector opening in order to obstruct contaminants entering the connector opening from an exterior of the housing, wherein the cable is prevented from being populated within the connector in the closed position; and
      an open position allowing the cable to be inserted into the connector opening.

2. The information handling resource of claim 1, wherein the information handling resource is an optical transceiver module and the electronic components comprise an optical transceiver.

3. The information handling resource of claim 1, wherein the connector cover is directly coupled to the housing via a hinge.

4. The information handling resource of claim 1, further comprising a pull tab mechanically coupled to the housing and configured to provide mechanical advantage to a user to remove the information handling resource from a port.

5. The information handling resource of claim 4, wherein the connector cover is rotatably coupled to the pull tab via a hinge.

6. The information handling resource of claim 1, further comprising:
   a first magnet configured to mechanically bias the connector cover in the closed position when the connector cover is in the closed position; and
   a second magnet configured to mechanically bias the connector cover in the open position when the connector cover is in the open position.

7. The information handling resource of claim 1, wherein the connector cover comprises a weighted portion configured to mechanically bias the connector cover in the closed position when the connector cover is in the closed position.

8. An information handling system comprising:
   a processor; and
   an information handling resource communicatively coupled to the processor, and comprising:
      a housing configured to house electronic components;
      a connector configured to communicatively couple a cable to the electronic components, the connector configured to couple to the cable via a connector opening of the housing; and a connector cover rotatably coupled to the housing proximate to the connector opening and configured to rotate between:
- a closed position in which the connector cover substantially covers the connector opening in order to obstruct contaminants entering the connector opening from an exterior of the housing, wherein the cable is prevented from being populated within the connector in the closed position; and
- an open position allowing the cable to be inserted into the connector opening.

9. The information handling system of claim 8, wherein the information handling resource is an optical transceiver module and the electronic components comprise an optical transceiver.

10. The information handling system of claim 8, wherein the connector cover is directly coupled to the housing via a hinge.

11. The information handling system of claim 8, the information handling resource further comprising a pull tab mechanically coupled to the housing and configured to provide mechanical advantage to a user to remove the information handling resource from a port of the information handling system.

12. The information handling system of claim 11, wherein the connector cover is rotatably coupled to the pull tab via a hinge.

13. The information handling system of claim 8, the information handling resource further comprising:
- a first magnet configured to mechanically bias the connector cover in the closed position when the connector cover is in the closed position; and
- a second magnet configured to mechanically bias the connector cover in the open position when the connector cover is in the open position.

14. The information handling system of claim 8, wherein the connector cover comprises a weighted portion configured to mechanically bias the connector cover in the closed position when the connector cover is in the closed position.

15. A method comprising:

housing electronic components and a connector within a housing, the connector configured to communicatively couple a cable to the electronic components, the connector configured to couple to the cable via a connector opening of the housing; and rotatably coupling a connector cover to the housing proximate to the connector opening such that the connector cover is configured to rotate between:
- a closed position in which the connector cover substantially covers the connector opening in order to obstruct contaminants entering the connector opening from an exterior of the housing, wherein the cable is prevented from being populated within the connector in the closed position; and
- an open position allowing the cable to be inserted into the connector opening.

16. The method of claim 15, wherein the information handling resource is an optical transceiver module and the electronic components comprise an optical transceiver.

17. The method of claim 15, further comprising mechanically coupling the connector cover directly to the housing via a hinge.

18. The method of claim 15, further comprising mechanically coupling a pull tab to the housing, the pull tab configured to provide mechanical advantage to a user to remove the information handling resource from a port.

19. The method of claim 18, further comprising rotably coupling the connector cover to the pull tab via a hinge.

20. The method of claim 15, further comprising:
- mechanically coupling a first magnet to the housing to mechanically bias the connector cover in the closed position when the connector cover is in the closed position; and
- mechanically coupling a second magnet to the housing mechanically bias the connector cover in the open position when the connector cover is in the open position.

21. The method of claim 15, further comprising forming a weighted portion in the connector cover to mechanically bias the connector cover in the closed position when the connector cover is in the closed position.

\* \* \* \* \*